United States Patent [19]

Alario et al.

[11] Patent Number: 5,362,183

[45] Date of Patent: Nov. 8, 1994

[54] SINGLE POINT CUTTING TOOL

[76] Inventors: Joseph Alario, 21 Swan La., Hauppauge, N.Y. 11788; Richard A. Bennett, 45 Wildwood La., Smithtown, N.Y. 11787; Ronald S. Dluginski, 9 Dyckman Ave., Garden City Park, N.Y. 11040; William P. Hermanek, 31 Wildwood La., Smithtown, N.Y. 11787

[21] Appl. No.: 131,674

[22] Filed: Oct. 5, 1993

[51] Int. Cl.⁵ .................. B23B 27/02; B23B 27/06; B23B 27/14
[52] U.S. Cl. ..................... 407/119; 407/65; 407/120
[58] Field of Search ............ 407/65, 117, 118, 119, 407/120; 82/13

[56] References Cited

U.S. PATENT DOCUMENTS

| | | | |
|---|---|---|---|
| 337,673 | 3/1886 | Eklund et al. | 407/65 |
| 517,004 | 3/1894 | Grant | 82/13 |
| 1,003,066 | 9/1911 | Riblet | 407/65 |
| 3,470,597 | 10/1969 | Val | 407/120 |
| 3,486,401 | 12/1969 | Kelm | 407/120 |
| 3,546,759 | 12/1970 | Sirola | 407/120 |
| 3,820,211 | 6/1974 | Kus | 407/65 |
| 4,332,513 | 6/1982 | Gowanlock | 407/120 |
| 4,802,799 | 2/1989 | Rachev | 407/62 |
| 5,022,797 | 6/1991 | Sawa et al. | 407/120 |
| 5,297,902 | 3/1994 | Jambor et al. | 407/42 |

*Primary Examiner*—William E. Terrell
*Attorney, Agent, or Firm*—Pollock, Vande Sande & Priddy

[57] ABSTRACT

A titanium-nitride coated carbide cutting tool is formed with complex angularly intersecting surfaces which form cutting edges having a generally trapezoidal configuration. The tool creates fine thread-like grooves in a circumferential wall of a tube which may be employed as a heat pipe. The generally trapezoidal resulting groove increases groove surface area that in turn increases working fluid wicking action.

6 Claims, 2 Drawing Sheets

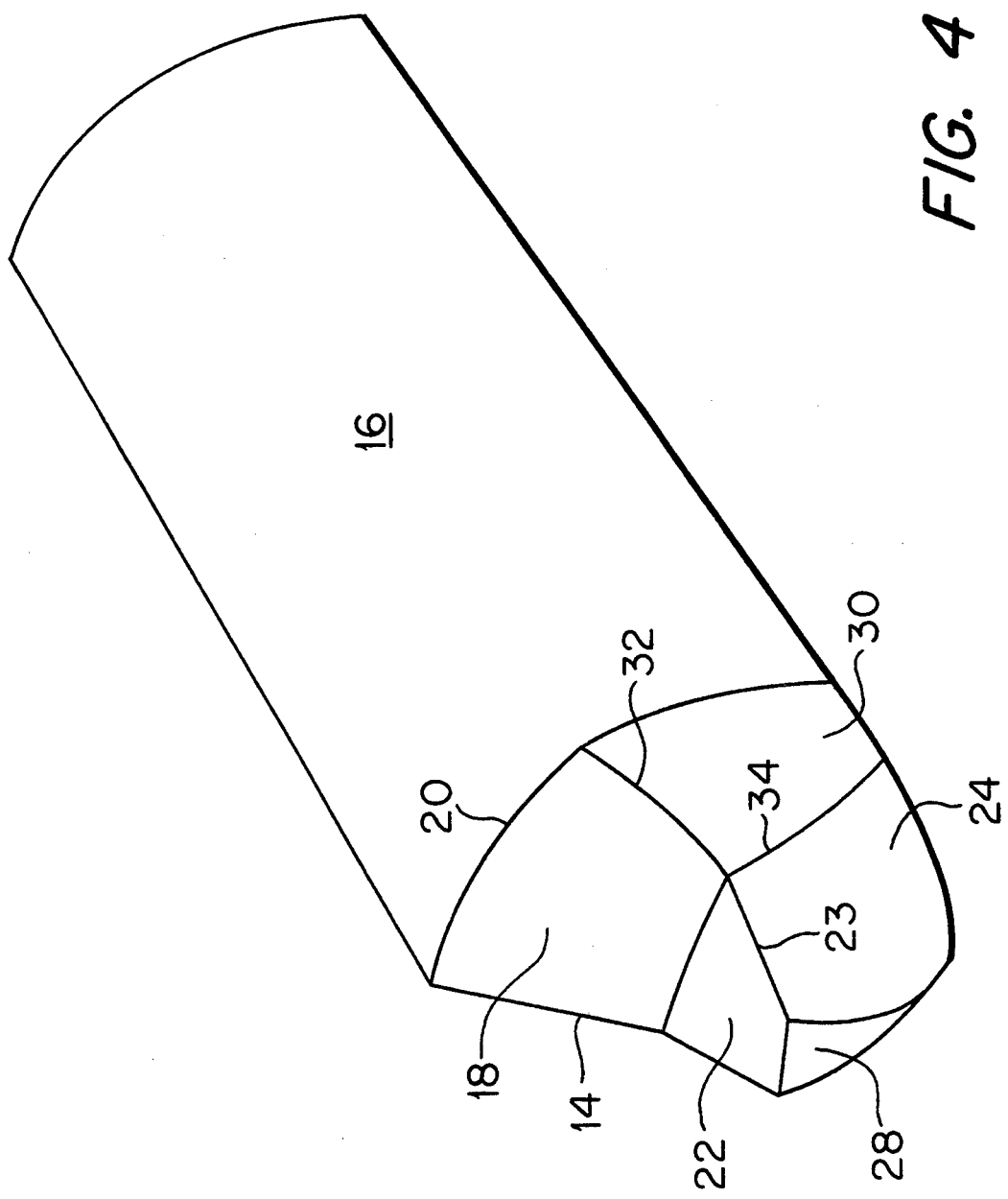

SINGLE POINT CUTTING TOOL

FIELD OF THE INVENTION

The present invention relates to machine tools, and more particularly to a single point cutting tool capable of cutting microgrooves.

BACKGROUND OF THE INVENTION

Electronic equipment is often provided with heat exchangers for maintaining an acceptable operating temperature. In both space and earth based systems, heat pipes are prevalently used. The efficiency of the heat pipe depends upon the circulation of working fluid, which in turn depends upon the capillary action of finely cut grooves within the heat pipe. Typically, v-shaped grooves are formed in a heat pipe. However, capillary action would be increased if the groove profile approached a rectangular configuration. In a practical sense, the rectangular configuration is an ideal and the obtaining a trapezoidal configuration is more practical.

Such a configuration offers increased grooved wall surface area for enhancing capillary action. Accordingly, working fluid within a heat pipe is able to rise in a manner opposing gravity and therefore wet the grooves of a heat pipe to a greater extent than otherwise obtainable.

BRIEF DESCRIPTION OF THE PRESENT INVENTION

The present invention offers a multi-surfaced cutting tool for creating fine threadlike grooves in the circumferential wall of a heat pipe to enhance heat transfer. Typically, 240 threads per inch may be formed which are 8–10 mils deep. The compound surfaces of the cutting tool form a trapezoidal groove profile while maintaining a very concentric threaded bore. The groove structure is precise and repetitive.

The groove formed by the present tool results in a more efficient wicking action by a heat pipe since individual grooves offer relatively greater height and groove surface area than the traditional v-groove.

BRIEF DESCRIPTION OF THE FIGURES

The above-mentioned objects and advantages of the present invention will be more clearly understood when considered in conjunction with the accompanying drawings, in which:

FIG. 4 is a perspective view of the present invention.

DETAILED DESCRIPTION OF THE INVENTION

Figure 1:
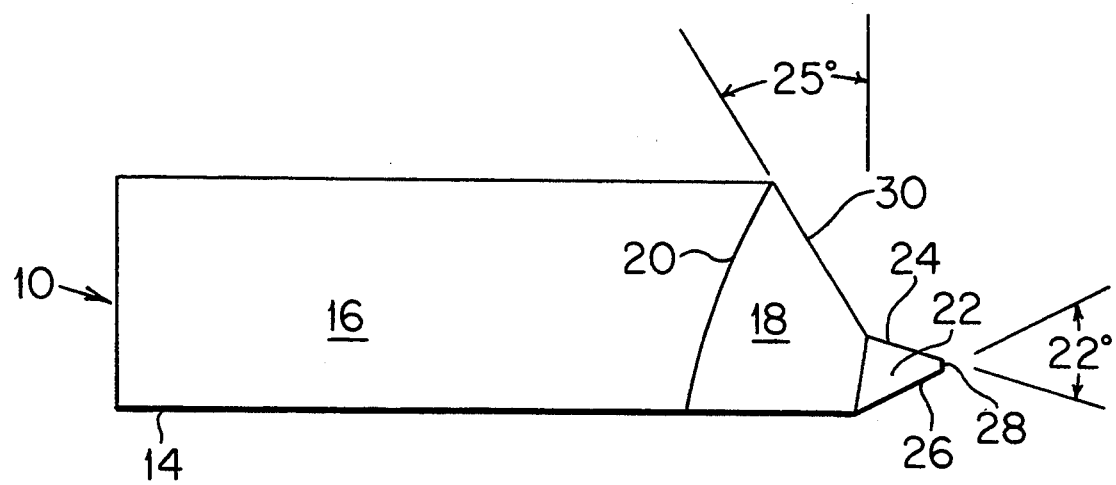
FIG. 1 is a top view of the present invention.
Figure 2:
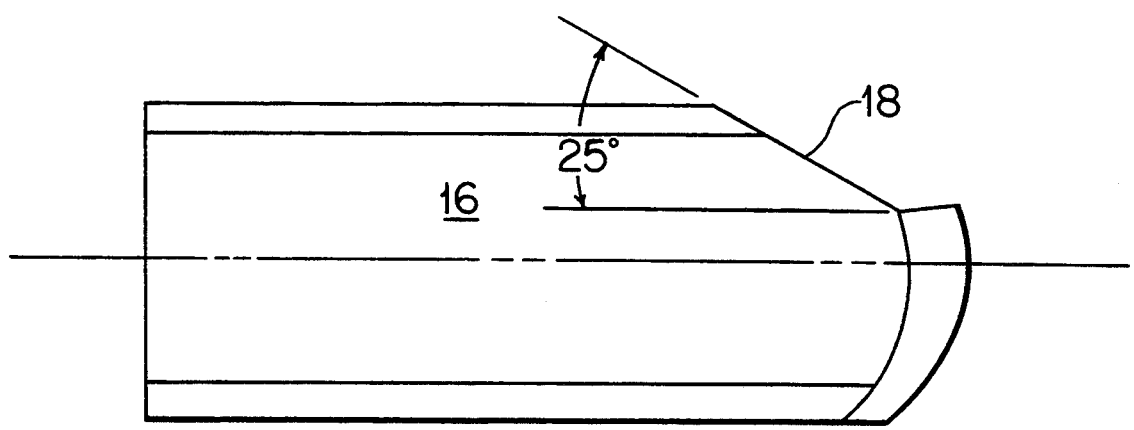
FIG. 2 is a side view of the present invention.
Figure 3:
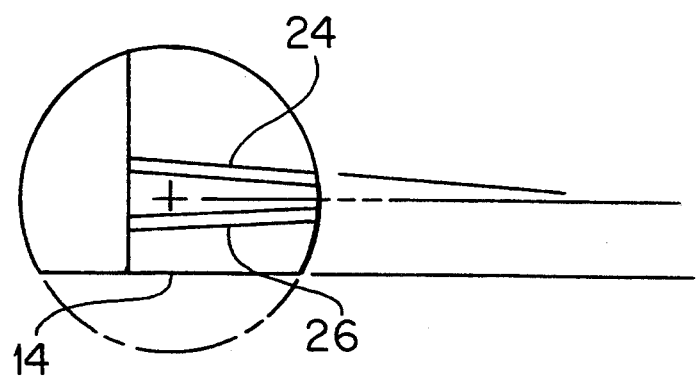
FIG. 3 is an end view of the present invention.

FIG. 4. is a perspective view of the present cutting tool indicating the compound surfaces at the forward end thereof which form a trapezoidal groove structure as the tool bores through a tube. The tool is generally indicated by 10 and is typically one-half inch long. The main body 16 of the tool has a flattened surface 14 and an intermediate circular segment surface 18 which extends from the flat surface 14 and intersects the cylindrical body 16 along an arc 20. The surface 18 is in effect a truncated circular segment further defined by surface 30 which forms an acute angle as indicated. Surface 18 is further bounded by surface 22. The latter mentioned surface terminates forwardly in surface 28 which is positioned perpendicularly to the center line of the tool. The surface 22 is bounded by surfaces 24 and 26, the latter surfaces defining a relative acute angle therebetween.

Surface 18 is further bounded by surface 30 which forms an obtuse angle relative to the surface 24.

Surface 30 itself is bounded by: curved edge 32 (common to surface 18); curved edge 34 (common to surface 24); arc 20 (common to main body 16); and flat surface 14.

In a preferred embodiment of the invention a titanium nitride coated C-2 micrograin carbide tool may be employed.

It should be understood that the invention is not limited to the exact details of construction shown and described herein for obvious modifications will occur to persons skilled in the art.

We claim:

1. A cutting tool comprising:
   a main cylindrical body;
   a longitudinally extending flattened first surface;
   a generally circular segment shaped second surface bounded by an arcuate edge and the flattened surface;
   a third surface adjacent the segment shaped surface and bounded by an extension of the arcuate edge, the third surface oriented at an acute angle with respect to a transverse plane;
   a generally trapezoidal shaped fourth surface extending forwardly from the segment shaped second surface;
   a fifth surface intersecting the first, third, and fourth surfaces;
   an obtuse angle formed between the third and fifth surfaces;
   a sixth surface, defining the forward end of the tool, and bounded by the fourth and fifth surfaces;
   a seventh surface defining a fourth edge of the trapezoidal fourth surface and positioned at an acute angle with respect to the fifth surface.

2. The tool set forth in claim 1 wherein the body is formed from carbide stock.

3. The tool set forth in claim 1 wherein the body is formed from micrograin carbide stock.

4. The tool set forth in claim 1 wherein the acute angle of the third surface is 25°.

5. The tool set forth in claim 1 wherein the acute angle between the fifth and seventh surfaces is 22°.

6. A cutting tool comprising:
   a main cylindrical body formed from micrograin carbide stock;
   a longitudinally extending flattened first surface;
   a generally circular segment shaped second surface bounded by an arcuate edge and the flattened surface:
   a third surface adjacent the segment shaped surface and bounded by an extension of the arcuate edge, the third surface oriented at an angle of 25° with respect to a transverse plane;
   a generally trapezoidal shaped fourth surface extending forwardly from the segment shaped second surface;
   a fifth surface intersecting the first, third, and fourth surfaces;
   an obtuse angle formed between the third and fifth surfaces;
   a sixth surface, defining the forward end of the tool, and bounded by the fourth and fifth surfaces;
   a seventh surface defining a fourth edge of the trapezoidal fourth surface and positioned at an angle of 22° with respect to the fifth surface.

* * * * *